United States Patent
Rouse

(10) Patent No.: US 10,447,089 B2
(45) Date of Patent: Oct. 15, 2019

(54) WIRELESS POWER TRANSFER SYSTEMS, METHODS AND TRANSMITTERS THEREFOR

(71) Applicant: Solace Power Inc., Mount Pearl (CA)

(72) Inventor: Chris Rouse, Mount Pearl (CA)

(73) Assignee: Solace Power Inc., Mount Pearl, NL (CA)

( * ) Notice: Subject to any disclaimer, the term of this patent is extended or adjusted under 35 U.S.C. 154(b) by 65 days.

(21) Appl. No.: 15/804,504

(22) Filed: Nov. 6, 2017

(65) Prior Publication Data
US 2019/0140480 A1 May 9, 2019

(51) Int. Cl.
*H02J 50/12* (2016.01)
*H01P 3/16* (2006.01)

(52) U.S. Cl.
CPC ............ *H02J 50/12* (2016.02); *H01P 3/16* (2013.01)

(58) Field of Classification Search
CPC ........ H01Q 1/24; H04B 10/61; H04B 5/0037; H04B 5/0087; H02J 50/12; H02J 50/20; H02J 50/40; H02J 50/80; H02J 7/025; H02J 5/005; H01F 38/14
USPC ........ 307/104, 9.1, 11, 75; 257/414; 438/48; 398/116
See application file for complete search history.

(56) References Cited

U.S. PATENT DOCUMENTS

| | | | | |
|---|---|---|---|---|
| 10,128,660 B1* | 11/2018 | Apte | | H02J 3/383 |
| 2013/0187475 A1* | 7/2013 | Vendik | | H01F 38/14 |
| | | | | 307/104 |
| 2014/0062214 A1* | 3/2014 | Seo | | H04B 5/02 |
| | | | | 307/104 |
| 2014/0062215 A1* | 3/2014 | Seo | | H01Q 15/0086 |
| | | | | 307/104 |
| 2014/0270786 A1* | 9/2014 | Poddar | | H04B 10/61 |
| | | | | 398/116 |
| 2017/0141583 A1* | 5/2017 | Adolf | | H02J 5/005 |
| 2017/0141584 A1* | 5/2017 | DeVaul | | H04W 76/14 |

* cited by examiner

*Primary Examiner* — Fritz M Fleming
*Assistant Examiner* — Jagdeep S Dhillon
(74) *Attorney, Agent, or Firm* — Harness, Dickey & Pierce, P.L.C.

(57) ABSTRACT

A transmitter comprises a power source; a transmit resonator electrically connected to the power source via an electrically small transmission line; and a metamaterial transmission line (MMTL) electrically connected between the power source and the electrically small transmission line. The transmit resonator comprises at least two electrodes; and at least one inductive coil electrically connected to the electrodes. The transmit resonator is configured to generate an electric field when excited by the power source. The electrically small transmission line is shorter in length than a wavelength of excitation of a power signal generated by the power source. The MMTL is configured to counteract an effect of the electrically small transmission line. The MMTL has a negative phase velocity (NPV).

16 Claims, 11 Drawing Sheets

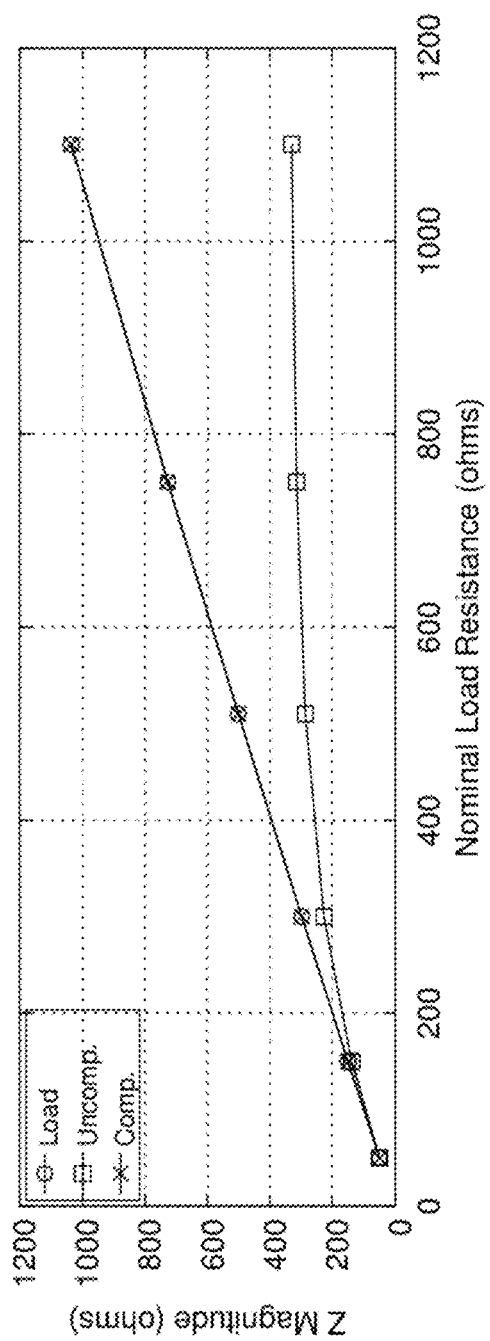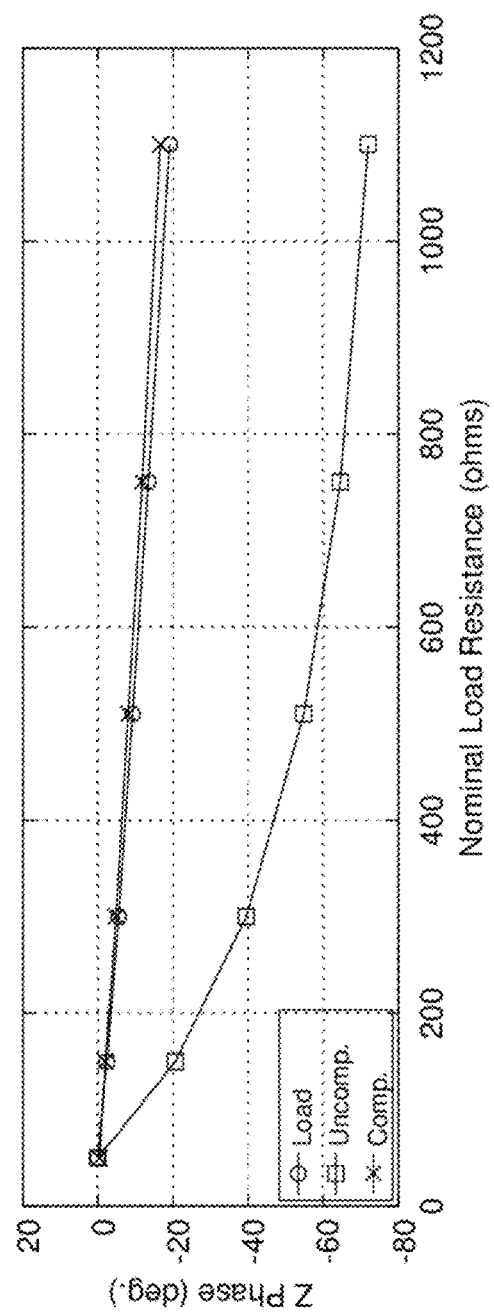

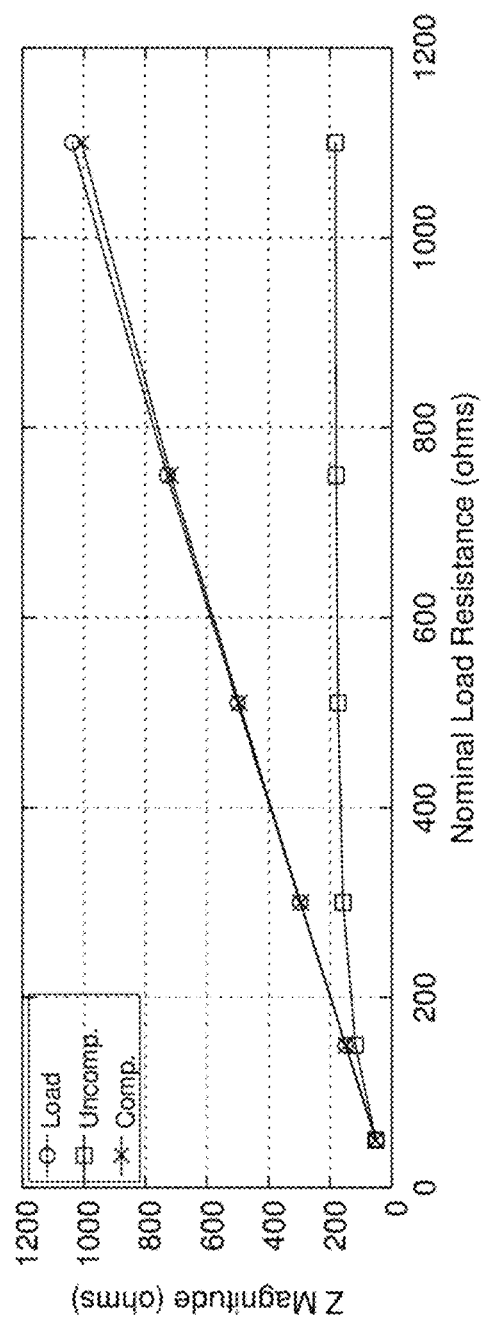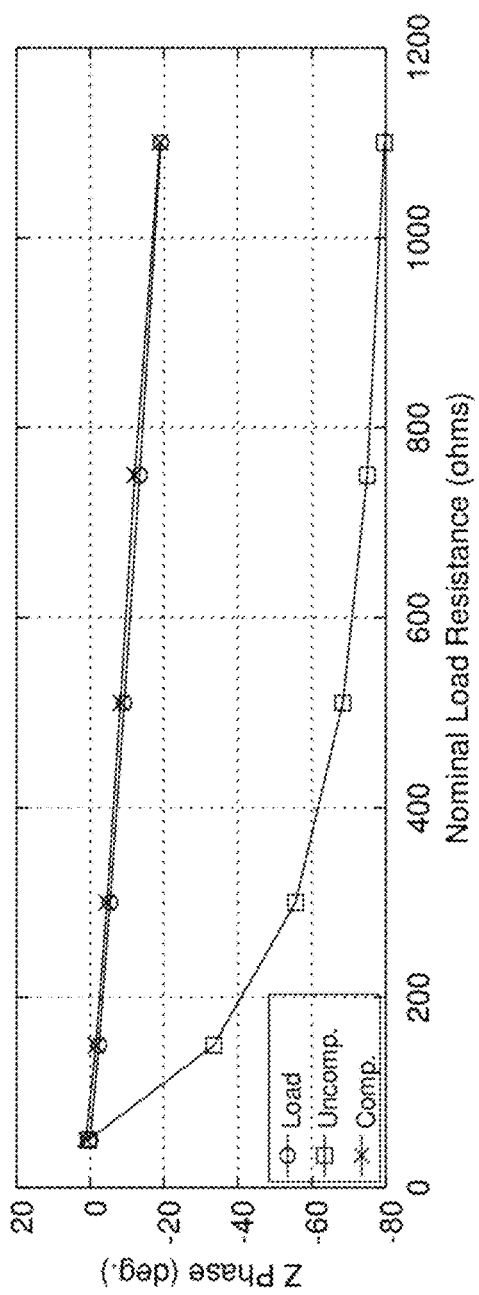

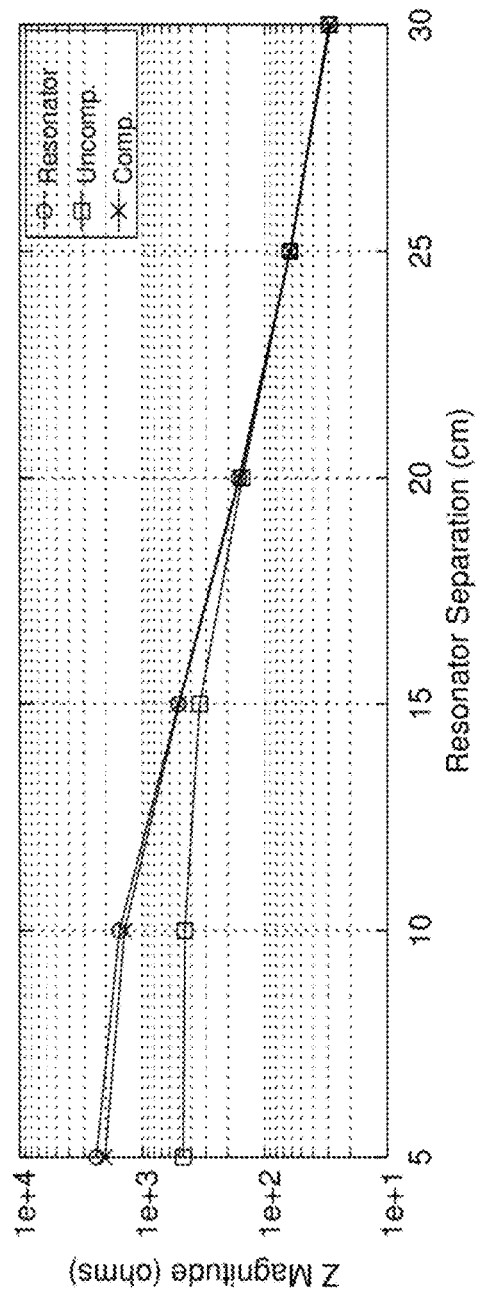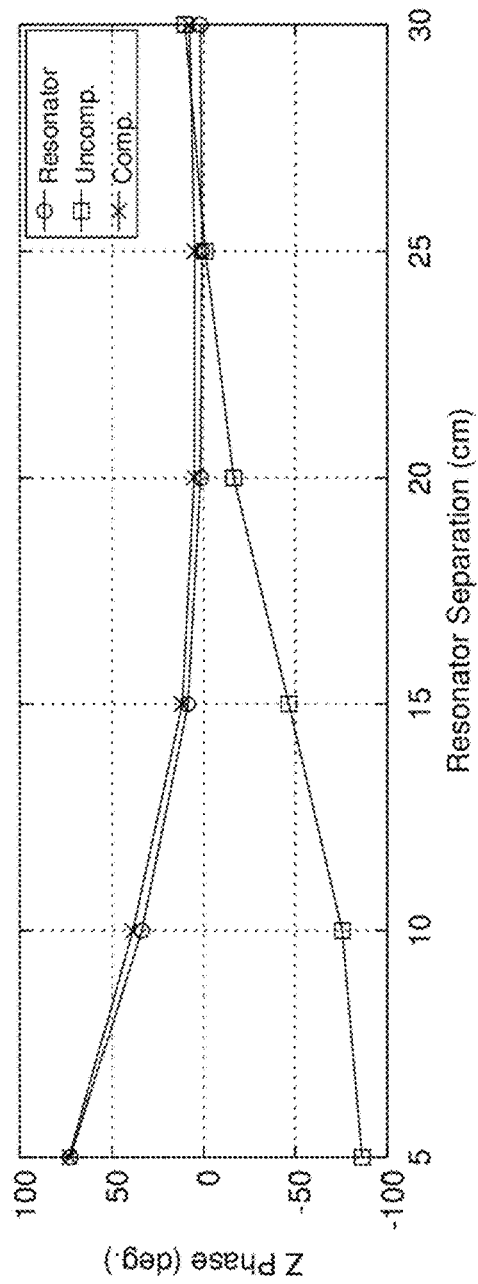

WIRELESS POWER TRANSFER SYSTEMS, METHODS AND TRANSMITTERS THEREFOR

FIELD

The subject application relates generally to wireless power transfer and in particular, to a wireless power transfer system and transmitter.

BACKGROUND

In the radio frequency (RF) engineering field, the impedance transformation effect results from the connection of a transmission line to a mismatched load impedance. However, it is commonly assumed that the impedance transformation effect is negligible when the transmission line length is small, meaning that the transmission line length is much smaller than a particular wavelength of excitation.

Turning now to FIG. 1, a diagram of a partial circuit is shown and is generally identified by reference numeral 8. The circuit 8 has an input impedance $Z_{in}$, a load impedance $Z_L$, and a transmission line with a characteristic impedance $Z_0$, a phase constant $\beta$ and a physical length $\Delta z$. The circuit 8 is driven by a sinusoidal power signal from a power source at a particular wavelength of excitation. The transmission line is assumed to be effectively lossless. The relationship between the input impedance $Z_{in}$ and the load impedance $Z_L$ is expressed as:

$$Z_{in} = Z_0 \frac{Z_L + jZ_0\tan(\beta\Delta z)}{Z_0 + jZ_L\tan(\beta\Delta z)} \quad \text{(Equation 1)}$$

As mentioned above, for electrically small transmission lines the impedance transformation effect is commonly assumed to be negligible. This is consistent with assuming that for electrically small transmission lines the terms involving $\beta\Delta z$ approach zero. The transmission line of FIG. 1 is electrically small when the length of the transmission line is much smaller than the wavelength of excitation of the power signal. When the terms involving $\beta\Delta z$ are assumed to be zero the relationship between the input impedance $Z_{in}$ and the load impedance $Z_L$ reduces to:

$$Z_{in} \cong Z_L \quad \text{(Equation 2)}$$

The accuracy of Equation 2 depends strongly on the magnitude of $Z_L$ relative to $Z_0$. For electrically small transmission lines $\tan(\beta\Delta z)$ is assumed to be approximately equal to $\beta\Delta z$ as per the small angle approximation. The relationship between the input impedance $Z_{in}$ and the load impedance $Z_L$ can then be expressed as:

$$Z_{in} \cong Z_0 \frac{Z_L + jZ_0\beta\Delta z}{Z_0 + jZ_L\beta\Delta z} \quad \text{(Equation 3)}$$

When $|Z_L|\beta\Delta z << |Z_0|$, Equation 3 can be simplified to the following:

$$Z_{in} \cong Z_L + jZ_0\beta\Delta z \quad \text{(Equation 4)}$$

In this scenario, the delay associated with the transmission line causes a shift in the wavelengths-toward-generator, or clockwise direction around the Smith chart. Since $|Z_L|<<|Z_0|$, the result is an effective series inductance.

When $|Z_L|>>|Z_0|\beta\Delta z$, Equation 3 can be simplified to the following:

$$Z_{in} \cong \frac{Z_L}{1 + jZ_LY_0\beta\Delta z} \quad \text{(Equation 5)}$$

In Equation 5, $Y_0$ is $Z_0^{-1}$. In this scenario, the delay associated with the transmission line causes a shift in the wavelengths-toward-generator, or clockwise direction around the Smith chart. Since $|Z_L|>>|Z_0|$, the result is an effective parallel capacitance. In both Equations 4 and 5, the transmission line causes a phase delay in the circuit 8.

This phase delay may be problematic for RF systems in which the goal is to efficiently deliver power to a variable load impedance, such as wireless power transfer systems that transfer power via resonant coupling. In such a wireless power transfer system, a power source outputs a sinusoidal power signal that drives a transmit resonator which transfers power to a receive resonator. The system input impedance exhibits an inverse relationship with the distance between the transmit and receive resonators. For a distance of 10 cm to 30 cm, a system input impedance of 1100Ω to 20Ω may be observed.

Table 1 below is an example set of input impedance $Z_{in}$ values calculated for a given set of load impedance $Z_L$ values for a $\Delta z$=0.3048 m (12") transmission line. In this example, the load impedance $Z_L$ values are selected from the set including 20Ω, 50Ω, 150Ω, 300Ω, 510Ω, 750Ω and 1100Ω. The characteristic impedance $Z_0$ of the transmission line is 50Ω. The phase constant $\beta$ of the transmission line is 0.426 rad/m. Assuming a propagation velocity of ⅔ of the speed of light, this phase constant $\beta$ corresponds to an excitation frequency of 13.56 MHz. As previously stated, the physical length $\Delta z$ of the transmission line is 0.3048 m (12"). The wavelength $\lambda$ of the power signal from the power source is 14.6304 m (576"). Thus, the physical length $\Delta z$ of the transmission line is $\lambda/48$. Given these values, $Z_{in}$ can be calculated according to Equation 1 for the various $Z_L$ values in the given range.

TABLE 1

| $Z_L$ (Ω) | $Z_{in}$ (Ω) |
|---|---|
| 20 | 20 + j6 |
| 50 | 50 + j0 |
| 150 | 132 − j45 |
| 300 | 189 − j142 |
| 510 | 187 − j242 |
| 750 | 158 − j302 |
| 1100 | 121 − j341 |

As shown in Table 1, the presence of the transmission line has an impact on the input impedance $Z_{in}$ of the circuit 8 except for the matched impedance case in which the load impedance $Z_L$ is equal to the characteristic impedance $Z_0$ of the transmission line. In the matched impedance case, both the load impedance $Z_L$ and the input impedance $Z_{in}$ are 50Ω. In the other cases (i.e. when the characteristic and load impedances are mismatched), the presence of the transmission line adds an additional reactance to the input impedance $Z_{in}$. Thus, the load impedance $Z_L$ and the input impedance $Z_{in}$ are not equal. For example when the load impedance $Z_L$ is 300Ω, the input impedance $Z_{in}$ is 189−j142Ω.

In the context of antennas or resonators in wireless power transfer systems that transfer power via resonant coupling, the additional reactance is analogous to detuning the transmitter of the wireless power transfer system, resulting in less efficient power transfer. It is therefore an object of an aspect of the subject disclosure to at least partially mitigate the impedance transformation effect of transmission lines on electrical systems.

SUMMARY

Accordingly, in one aspect there is provided a transmitter comprising: a transmit resonator electrically connected to a power source of the transmitter via an electrically small transmission line, the transmit resonator comprising: at least two electrodes; and at least one inductive coil electrically connected to the electrodes, wherein the transmit resonator is configured to generate an electric field when excited by the power source, wherein the electrically small transmission line is shorter in length than a wavelength of excitation of a power signal generated by the power source; and a metamaterial transmission line (MMTL) electrically connected between the power source and the electrically small transmission line, the MMTL configured to counteract an effect of the electrically small transmission line, wherein the MMTL has a negative phase velocity (NPV).

In one or more embodiments, the electrically small transmission line has a phase constant $\beta$, a physical length $\Delta z$, and $\tan(\beta \Delta z) \cong \beta \Delta z$.

In one or more embodiments, the electrically small transmission line has a phase constant $\beta$ and a physical length $\Delta z$, and $\beta \Delta z < 0.2$ radians.

In one or more embodiments, the electrically small transmission line has a physical length $\Delta z$, the power signal has a wavelength $\lambda$, and $\Delta z < \lambda/30$.

In one or more embodiments, the MMTL comprises a unit cell. In another embodiment, the unit cell comprises a symmetrical T-network. In another embodiment, the symmetrical T-network comprises two series capacitors and a shunt inductor. In another embodiment, the capacitance of the capacitors is given by $2C_0$ and the inductance of the inductor is given by $L_0$, wherein:

$$C_0 \cong \frac{1}{\omega^2 Z_0 \beta \Delta z}$$
$$L_0 \cong \frac{Z_0}{\omega^2 \beta \Delta z}$$

and wherein $Z_0$ is the characteristic impedance of the transmission line, $\beta$ is the phase constant of the electrically small transmission line, $\Delta z$ is the length of the electrically small transmission line and w is the angular frequency of a power signal output by the power source.

In another embodiment, the unit cell comprises a symmetrical $\pi$-network.

In one or more embodiments, the MMTL comprises n unit cells, where n is a positive integer.

In one or more embodiments, the transmitter further comprises the power source.

According to another aspect there is provided a system comprising: a transmitter comprising: a transmit resonator electrically connected to a power source of the transmitter via an electrically small transmission line, the transmit resonator comprising: at least two active electrodes; and at least one inductive coil electrically connected to the active electrodes, wherein the transmit resonator is configured to generate an electric field when excited by the power source, wherein the electrically small transmission line is shorter in length than a wavelength of excitation of a power signal generated by the power source; and a metamaterial transmission line (MMTL) electrically connected between the power source and the electrically small transmission line, the MMTL configured to counteract an effect of the electrically small transmission line, wherein the MMTL has a negative phase velocity (NPV); and a receiver configured to extract power from the generated electric field via resonant electric field coupling.

In another embodiment, the receiver further comprises: a load; and a receive resonator electrically connected to the load.

In another embodiment, the receive resonator comprises: at least two active electrodes; and at least one inductive coil electrically connected to the active electrodes of the receiver, wherein the receive resonator is configured to receive power transmit resonator via resonant electric field coupling.

In another embodiment, the transmitter further comprises the power source.

According to another aspect there is a system comprising: a power source; a load electrically connected to the power source via an electrically small transmission line, wherein the electrically small transmission line is shorter in length than a wavelength of excitation of a sinusoidal power signal generated by the power source; and a metamaterial transmission line (MMTL) electrically connected between the power source and the electrically small transmission line, the MMTL configured to counteract an effect of the electrically small transmission line, wherein the MMTL has a negative phase velocity (NPV).

According to another aspect there is provided a transmitter comprising: a transmit resonator electrically connected to a power source of the transmitter via an electrically small transmission line shorter in length than a wavelength of excitation of a power signal generated by the power source, wherein the transmit resonator is configured to generate an electric field when excited by the power; and a metamaterial transmission line (MMTL) electrically connected between the power source and the electrically small transmission line, the MMTL configured to counteract an impedance transformation caused by the electrically small transmission line.

According to another aspect there is provided a metamaterial transmission line (MMTL) electrically connected between a power source and an electrically small transmission line connected to a load, wherein the electrically small transmission line is shorter in length than a wavelength of excitation of a sinusoidal power signal generated by the power source, wherein the MMTL configured to counteract an effect of the electrically small transmission line.

In another embodiment, the MMTL causes a negative phase delay that counters a phase delay caused by the electrically small transmission line.

In another embodiment, the MMTL causes a phase shift that is opposite in sign to a phase shift caused by the electrically small transmission line.

In another embodiment, phase and group velocities of a wave travelling through the MMTL are opposite in sign to phase and group velocities of a wave travelling through the electrically small transmission line.

In another embodiment, propagation through the MMTL incurs a negative phase delay.

In another embodiment, the MMTL has impedance characteristics that are substantially inverse to impedance characteristics of the electrically small transmission line.

BRIEF DESCRIPTION OF THE DRAWINGS

Embodiments will now be described more fully with reference to the accompanying drawings in which:

FIG. 8a is a graph of the magnitude of the input impedance versus the nominal load resistance of a system using the unit cell of FIG. 6 for a transmission line with a physical length of 0.3048 m;

FIG. 8b is a graph of the phase of the input impedance versus the nominal load resistance of a system using the unit cell of FIG. 6 for a transmission line with a physical length of 0.3048 m; and FIG. 9a is a graph of the magnitude of the input impedance versus the nominal load resistance of a system using the unit cell of FIG. 6 for a transmission line with a physical length of 0.6096 m;

FIG. 9b is a graph of the phase of the input impedance versus the nominal load resistance of a system using the unit cell of FIG. 6 for a transmission line with a physical length of 0.6096 m;

FIG. 11a is a graph of the magnitude of the input impedance of a transmit resonator versus the separation between the transmit and receive resonators of the wireless power transfer system of FIG. 10 using the unit cell of FIG. 6 for a transmission line with a physical length of 0.3048 m; and FIG. 11b is a graph of the phase of the input impedance of the transmit resonator versus the separation between the transmit and receive resonators of the wireless power transfer system of FIG. 10 using the unit cell of FIG. 6 for a transmission line with a physical length of 0.3048 m.

DETAILED DESCRIPTION OF EMBODIMENTS

Figure 1:
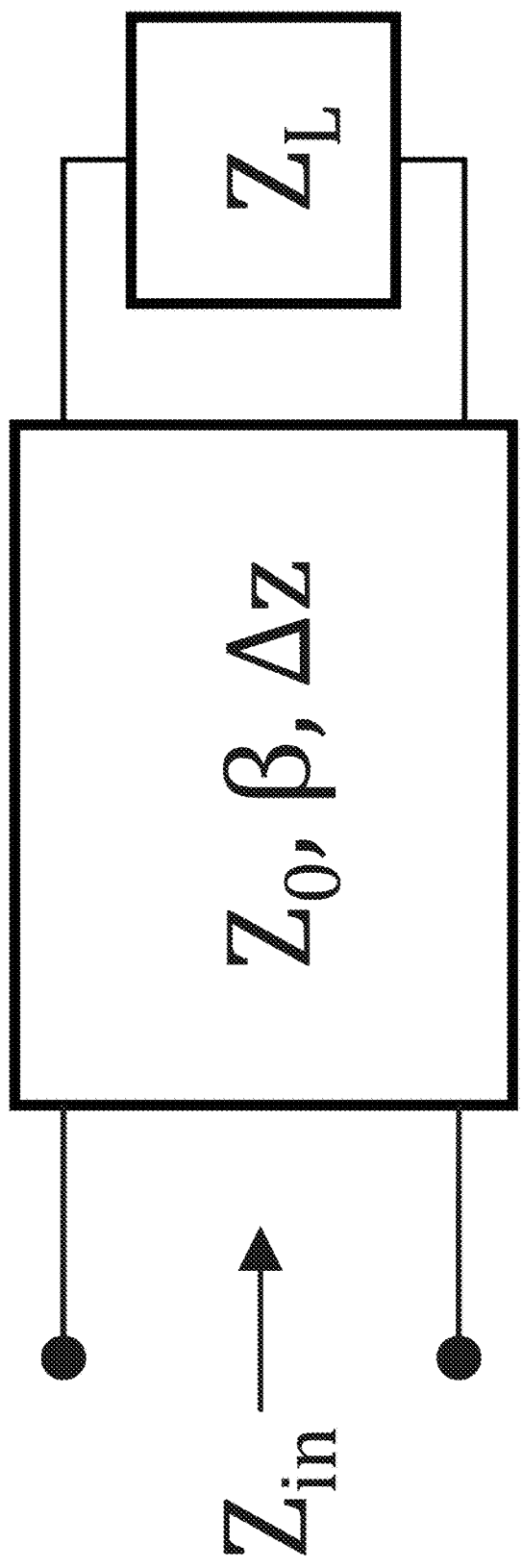
FIG. 1 is a diagram of a partial circuit.

The foregoing summary, as well as the following detailed description of certain examples will be better understood when read in conjunction with the appended drawings. As used herein, an element or feature introduced in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the described elements or features. Moreover, unless explicitly stated to the contrary, examples or embodiments "comprising" or "having" or "including" an element or feature or a plurality of elements or features having a particular property may include additional elements or features not having that property. Also, it will be appreciated that the terms "comprises", "has", "includes" means "including by not limited to" and the terms "comprising", "having" and "including" have equivalent meanings. It will also be appreciated that like reference characters will be used to refer to like elements throughout the description and drawings.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, and/or designed for the purpose of performing the function. It is also within the scope of the subject application that elements, components, and/or other subject matter that is described as being adapted to perform a particular function may additionally or alternatively be described as being configured to perform that function, and vice versa. Similarly, subject matter that is described as being configured to perform a particular function may additionally or alternatively be described as being operative to perform that function.

It will be understood that when an element is referred to as being "on," "attached" to, "connected" to, "coupled" with, "contacting," etc., another element, it can be directly on, attached to, connected to, coupled with or contacting the other element or intervening elements may also be present.

Unless defined otherwise, all technical and scientific terms used herein have the same meaning as is commonly understood by one of skill in the art to which the subject disclosure pertains.

In the following, exemplary transmitters and power transfer systems incorporating the same are disclosed. Broadly, the transmitter comprises a power source; a transmit resonator electrically connected to the power source via an electrically small transmission line, the transmit resonator comprising: at least two electrodes; and at least one inductive coil electrically connected to the electrodes, wherein the transmit resonator is configured to generate an electric field when excited by the power source; and a metamaterial transmission line (MMTL) electrically connected between the power source and the electrically small transmission line, the MMTL configured to counteract an effect of the electrically small transmission line. Particular non-limiting examples of the transmitter and systems incorporating the same will now be described.

Figure 2:
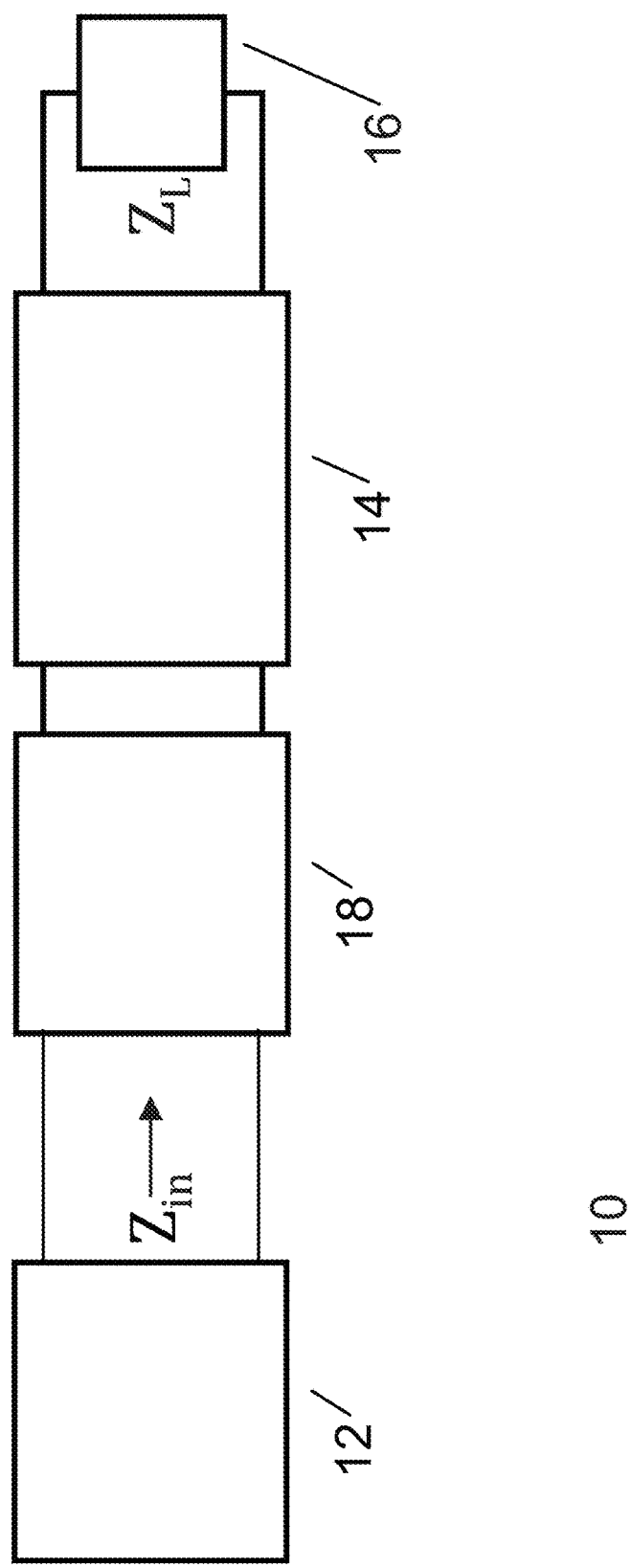
FIG. 2 is a circuit diagram of a power transfer system in accordance with an aspect of the subject disclosure.

Turning now to FIG. 2, a circuit diagram of a power transfer system is shown and is generally identified by reference numeral 10. The power transfer system 10 comprises a power source 12 electrically connected via a transmission line 14 to a load 16. The power source 12 is configured to generate a sinusoidal power signal. As previously described, as a result of the impedance transformation effect, the transmission line 14 results in at least a partial impedance transformation. Thus, the impedance presented to the power source 12 differs from the load impedance. A metamaterial transmission line (MMTL) 18 is electrically connected between the power source 12 and the transmission line 14 and is configured to counteract an impedance transformation caused by the transmission line 14 as will be described. The MMTL 18 has a negative phase velocity (NPV).

As previously discussed, the transmission line 14 causes a delay that may be problematic for the power transfer system 10 in which the goal is efficient delivery of power. The MMTL 18 is configured to counteract the impedance transformation caused by the transmission line 14. The MMTL 18 is configured to invert the effect of the transmission line 14. Specifically, the MMTL 18 is configured to create a negative phase delay that counters that phase delay caused by the transmission line 18 as will be described.

As expressed by Equation 4, the presence of the transmission line 14 between the power source 12 and the load 16 may add an effective series inductance to the impedance seen by the power source 12 when the magnitude of the load impedance $Z_L$ is much smaller than the characteristic impedance $Z_0$ of the transmission line 14. In this situation, the MMTL 18 is configured to at least partially reduce the series inductance term of Equation 4 when the magnitude of the load impedance $Z_L$ is much smaller than the characteristic impedance $Z_0$ of the transmission line 14.

As expressed by Equation 5, the presence of the transmission line 14 between the power source 12 and the load 16 may add an effective parallel capacitance to the impedance seen by the power source 12 when the magnitude of the load impedance $Z_L$ is much larger than the characteristic impedance $Z_0$ of the transmission line 14. In this situation, the MMTL 18 is configured to at least partially reduce the parallel capacitance term of Equation 5 when the magnitude of the load impedance $Z_L$ is much larger than the characteristic impedance $Z_0$ of the transmission line 58.

As previously stated, the MMTL 18 is configured to have a NPV. Generally, in the field of RF engineering, the term metamaterial (MM) is applied to elements that exhibit a negative permittivity and a negative permeability. A consequence of the negative permittivity and permeability is that the MM has a negative refractive index (NRI). In the context of transmission lines, which guide electromagnetic energy through a one-dimensional medium (e.g. electromagnetic waves only travel in the forward or reverse directions), the MM is one-dimensional. A one-dimensional MM allows for wave travel along a single dimension only. Thus, the MMTL 18 is a one-dimensional NRI metamaterial. A MMTL 18 with a NRI has electric and magnetic fields that form a left-handed triplet with the wave vector. A MMTL 18 with a left-handed triplet is referred to as a left-handed (LH) transmission line.

When an electromagnetic wave propagates through the MMTL 18 with a NRI, phase and group velocities of the wave travelling through the MMTL 18 are opposite in sign to the wave travelling through the transmission line 14. The NRI of the MMTL 18 therefore results in the negative phase velocity (NPV). The NPV of the MMTL 18 results in a phase shift. The phase shift resulting from the MMTL 18 is opposite in sign to the phase shift caused by the transmission line 14. Thus, propagation through the metamaterial incurs a negative phase delay.

One of the key assumptions when deriving the NRI property of the MMTL 18 is that there is only a forward travelling wave. This means that the MMTL 18 must either be made up of an infinite series of unit cells or made of a finite number of unit cells which are terminated in the Bloch impedance, which is generally the characteristic impedance of the MMTL 18, taken at the terminals between the finite unit cells.

Generally, the MMTL 18 is designed such that the Bloch impedance is equal to the characteristic impedance $Z_0$ of the system to which it will be applied, and the system is designed such that impedance matching is maintained. Thus, there is only a forward travelling wave. In a mismatched case, the load impedance $Z_L$ is arbitrary and is not necessarily impedance-matched to the transmission line 14. In the mismatched case, there will be a wave reflection at the load leading to both forward and reverse travelling waves. When there are both forward and reverse travelling waves, metamaterial (MM) theory should break down. However, MM theory can still be applied to design the MMTL 18, which will counteract the impedance transformation effect of the transmission line 14 as long as the length of the transmission line 14 is electrically small. As previously stated, the length of the transmission line 14 is electrically small when the length is shorter than a wavelength of excitation of the sinusoidal power signal generated by the power source 12.

The input impedance $Z_{in}$ and the load impedance $Z_L$ of the power transfer system 10 can be represented by the following matrix:

$$\begin{bmatrix} V_{in} \\ I_{in} \end{bmatrix} = \begin{bmatrix} A & B \\ C & D \end{bmatrix} \begin{bmatrix} \cos(\beta\Delta z) & jZ_0\sin(\beta\Delta z) \\ jY_0\sin(\beta\Delta z) & \cos(\beta\Delta z) \end{bmatrix} \begin{bmatrix} V_L \\ I_L \end{bmatrix} \quad \text{(Equation 6)}$$

The ABCD matrix represents the MMTL 18. The adjacent matrix containing trigonometric functions represents the transmission line 14 and is derivable from Equation 1. $V_{in}$ and $I_{in}$ represent the input voltage and current, respectively, of the power signal generated by the power source 12 such that $Z_{in}=V_{in}/I_{in}$. Similarly, $V_L$ and $I_L$ represent the load voltage and current, respectively, such that $Z_L=V_L/I_L$. To counteract the effects of the transmission line 14, $V_{in}$ must equal $V_L$ and $I_{in}$ must equal $I_L$. The nontrivial solution requires the ABCD matrix to be the inverse of the transmission line matrix. Therefore, the ABCD matrix is represented by the following matrix:

$$\begin{bmatrix} A & B \\ C & D \end{bmatrix} = \begin{bmatrix} \cos(\beta\Delta z) & -jZ_0\sin(\beta\Delta z) \\ -jY_0\sin(\beta\Delta z) & \cos(\beta\Delta z) \end{bmatrix} \quad \text{(Equation 7)}$$

When the physical length of the transmission line 14 is electrically small Equation 7 can be simplified. In the context of this derivation, the transmission line 14 is electrically small when $\beta\Delta z<0.2$ radians or when the physical length of the transmission line 14 is less than $\lambda/30$. As previously stated, $\lambda$ is the wavelength of the power signal from the power source 12. Equation 7 can therefore be simplified using small-angle approximations to the following matrix:

$$\begin{bmatrix} A & B \\ C & D \end{bmatrix} = \begin{bmatrix} 1-\frac{(\beta\Delta z)^2}{2} & -jZ_0\beta\Delta z \\ -jY_0\beta\Delta z & 1-\frac{(\beta\Delta z)^2}{2} \end{bmatrix} \quad \text{(Equation 8)}$$

The transmission line 14 can be represented using the lumped element model. Since the transmission line 14 is assumed to be effectively lossless, the characteristic impedance $Z_0$ and the phase constant $\beta$ can be expressed as:

$$Z_0 = \sqrt{\frac{L'}{C'}} \quad \text{(Equation 9)}$$

$$\beta = \omega\sqrt{L'C'} \quad \text{(Equation 10)}$$

The variable $\omega$ is the angular frequency of the power signal. The variable $L'$ is the per-unit-length inductance of the transmission line 14. The variable $C'$ is the per-unit-length capacitance of the transmission line 14.

Substituting $Z_0$ and $\beta$ in Equation 8 for the values in Equations 9 and 10 and recalling that $Y_0$ is $Z_0^{-1}$ yields the following result:

$$\begin{bmatrix} A & B \\ C & D \end{bmatrix} = \begin{bmatrix} 1 - \frac{\omega^2 L'C'\Delta z^2}{2} & -j\omega L'\Delta z \\ -j\omega C'\Delta z & 1 - \frac{\omega^2 L'C'\Delta z^2}{2} \end{bmatrix} \quad \text{(Equation 11)}$$

When the MMTL 18 is represented by the matrix identified in Equation 11, the MMTL 18 will counteract the impedance transformation caused by the transmission line 14. Specifically, the MMTL 18 will counteract the impedance transformation caused by the transmission line 14 on the load impedance.

Figure 3:
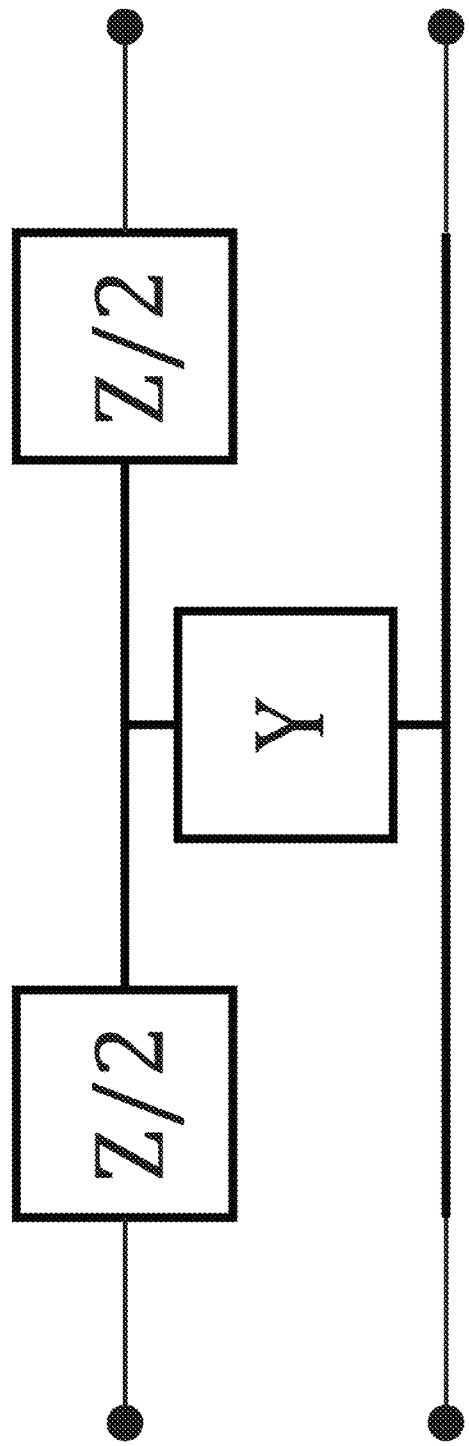
FIG. 3 is a circuit topology of a unit cell of a metamaterial transmission line (MMTL) forming a part of the power transfer system of FIG. 2.

In one embodiment, the MMTL 18 comprises a single unit cell implemented as a symmetrical T-network. The circuit topology of an exemplary symmetrical T-network is shown in FIG. 3. While the circuit topology shown in FIG. 3 is associated with a small propagation delay, the propagation delay is assumed to be negligible for this analysis. For the circuit topology shown in FIG. 3, the parameters of the ABCD matrix of the MMTL 18 can be expressed as follows:

$$\begin{bmatrix} A & B \\ C & D \end{bmatrix} \cong \begin{bmatrix} 1 + \frac{ZY}{2} & Z + \frac{Z^2 Y}{4} \\ Y & 1 + \frac{ZY}{2} \end{bmatrix} \quad \text{(Equation 12)}$$

The A, C and D parameters in Equation 11 can be achieved if:

$$Y = -j\omega C'\Delta z \quad \text{(Equation 13)}$$

$$Z = -j\omega L'\Delta z \quad \text{(Equation 14)}$$

Based on these results, the parameter for B is given by:

$$B = -j\omega L'\Delta z \left(1 - \frac{\omega^2 L'C'\Delta z^2}{4}\right) \quad \text{(Equation 15)}$$

Alternatively, this can be written as:

$$B = -j\omega L'\Delta z \left(1 - \left(\frac{\beta\Delta z}{2}\right)^2\right) \quad \text{(Equation 16)}$$

As previously stated, it has been assumed that the transmission line 14 is electrically small and thus $\beta\Delta z < 0.2$ radians. The term $1 - (\beta\Delta z/2)^2$ in Equation 16 will therefore be in the range of 0.99 to 1. Thus, $1-(\beta\Delta z/2)^2$ can be approximated to one. Accordingly, Equation 16 can be approximated as:

$$B \cong -j\omega L'\Delta z \quad \text{(Equation 17)}$$

The T-network is implemented using two series capacitors, each with a value of $2C_0$, and a shunt inductor with a value of $L_0$. These can be expressed as:

$$C_0 \cong \frac{1}{\omega^2 L'\Delta z} \quad \text{(Equation 18)}$$

$$L_0 \cong \frac{1}{\omega^2 C'\Delta z} \quad \text{(Equation 19)}$$

Thus, the T-network shown in FIG. 3 can be designed to satisfy three of the four ABCD parameters for inverting the effects of an electrically small transmission line, and to approximate the fourth parameter (B) very closely.

$C_0$ and $L_0$ can also be expressed in terms of the parameters of the transmission line 14. As previously stated, the parameters comprise the characteristic impedance $Z_0$, the phase constant $\beta$ and the physical length $\Delta z$ of the transmission line 14. Expressing Equations 18 and 19 in terms of the parameters of the transmission line 14 yields the following:

$$C_0 \cong \frac{1}{\omega^2 Z_0 \beta \Delta z} \quad \text{(Equation 20)}$$

$$L_0 \cong \frac{Z_0}{\omega^2 \beta \Delta z} \quad \text{(Equation 21)}$$

Equations 20 and 21 are the same as those which may be used to design a MMTL comprising a single cell in an impedance matched system. Thus, MM theory can still be applied for an impedance mismatched system when the transmission line 14 is electrically small.

Figure 4:
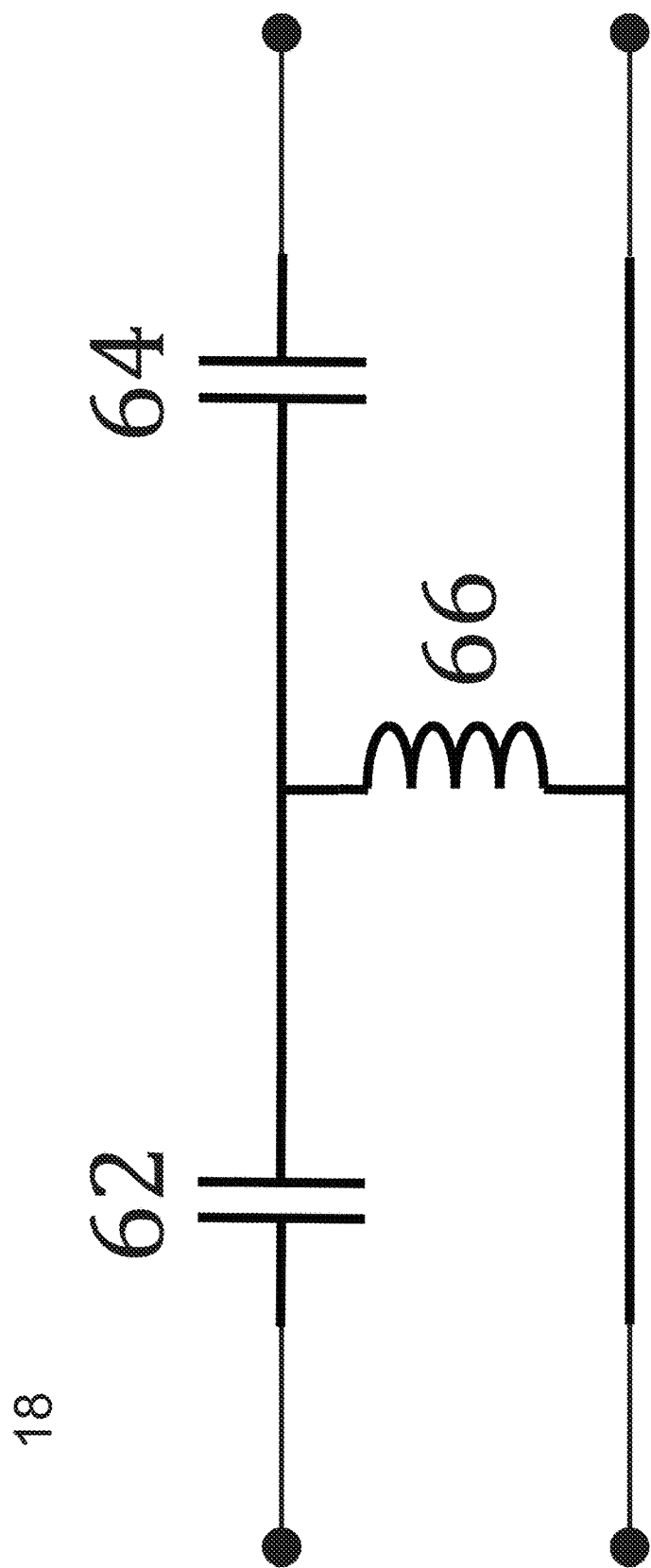
FIG. 4 is a schematic layout of the unit cell of FIG. 3.

Inserting $C_0$ and $L_0$ into the circuit topology of FIG. 3 yields the resultant single unit cell of the MMTL 18 as shown in FIG. 4. In this embodiment, the single unit cell comprises a first capacitor 62 connected in a series to a second capacitor 64 and a shunt inductor 66 between the capacitors 62 and 64. The capacitance of the first and second capacitors 62 and 64 is given by $2C_0$, where $C_0$ has a value as per Equation 18. The inductance of the inductor 66 is given by $L_0$ with a value as per Equation 19.

While the single unit cell of the MMTL 18 has been described as a symmetrical T-network, one of ordinary skill in the art will appreciate that other configurations are possible. For example, in another embodiment, the single cell of the MMTL 18 may be a symmetrical $\pi$-network.

Furthermore, while MMTL 18 comprising a single unit cell has been described, one of ordinary skill in the art will appreciate that still other configurations are possible. For example, in another embodiment, the MMTL 18 comprises n unit cells, where n is an integer value and greater than 1. In this embodiment, each unit cell is configured to produce a fraction of the negative phase delay required to cancel the phase delay of the transmission line 14. In particular, each unit cell is configured to cancel an equal fraction of the phase delay of the transmission line 14. Thus, each unit cell is configured to cancel a phase delay of $\beta\Delta z/n$. To calculate the values of the components of each unit cell, Equations 18 to 21 are multiplied by n.

The MMTL 18 comprising a single unit cell as described above corrects for the impedance transformation effect through a range of lengths Δz of the transmission line 14. The maximum length Δz of the transmission line 14 at which the MMTL 18 no longer corrects for the impedance transformation effect occurs when the input impedance $Z_{in}$ is no longer sufficiently close to the load impedance $Z_L$. For this disclosure, the input impedance $Z_{in}$ is no longer sufficiently close to the load impedance $Z_L$ when the relative magnitude error between the input impedance $Z_{in}$ and the load impedance $Z_L$ exceeds 10% or the absolute phase error between the input impedance $Z_{in}$ and the load impedance $Z_L$ exceeds 5°. With the application of the MMTL 18, the upper limit on the applicable physical length Δz of the transmission line 14 is dictated by the assumption that the transmission line 14 is electrically small. As the physical length Δz increases to the point where the transmission line 14 is no longer electrically small, MM theory breaks down. In this case, the MMTL 18 no longer counteracts the impedance transformation effect of the transmission line 14. There is also a lower limit on the physical length Δz of the transmission line 14 for which use of the MMTL 18 is of value. As the physical length Δz of the transmission line 14 decreases toward zero, eventually the impedance transformation effect becomes negligible and compensation from the MMTL 18 is not necessary. These two considerations define the range of physical lengths Δz of the transmission line 14 over which it is desirable to apply the MMTL 18.

Compensated and un-compensated power transfer systems were modeled using Octave™ to determine maximum lengths Δz of the transmission line 14. When the MMTL 18 is present such as in the power transfer system 10, the power transfer system 10 is referred to as a compensated system. When the MMTL 18 is not present in the power transfer system 10, the power transfer system is referred to as an un-compensated system.

Figure 5:
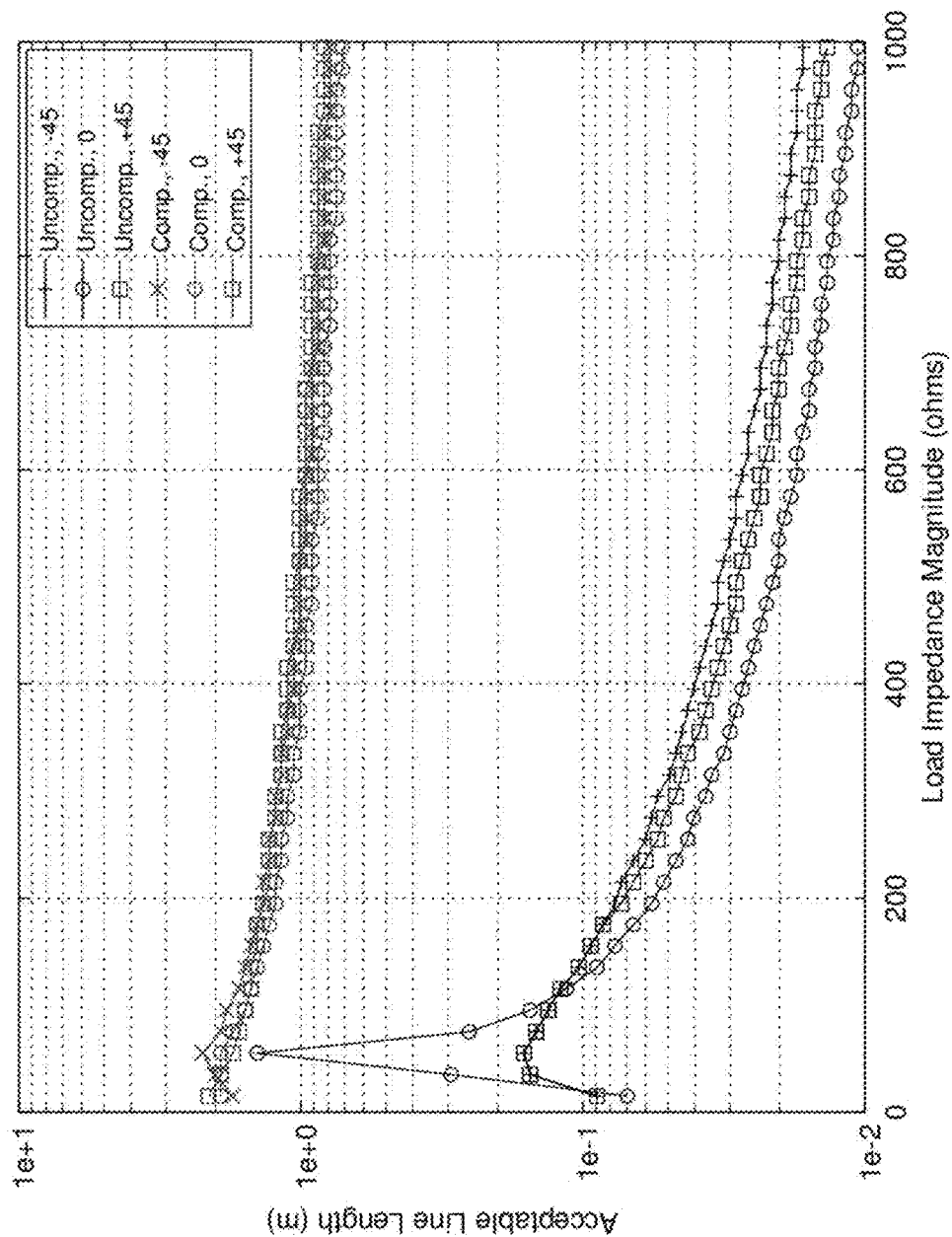
FIG. 5 is a graph of a maximum length of a transmission line of the power transfer system of FIG. 2 with and without the MMTL.

A characteristic impedance $Z_0$ of 50Ω and a phase constant β of 0.426 rad/m were utilized for the calculations. Assuming a propagation velocity of ⅔ of the speed of light, this phase constant β corresponds to an excitation frequency of 13.56 MHz. Calculations were made for load impedances $Z_L$ with phase of −45°, 0° and +45°. The results of these calculations are shown in FIG. 5, where FIG. 5 is a graph of the maximum length Δz of the transmission line 14 versus the load impedance $Z_L$ magnitude for the compensated system and the un-compensated system.

As will be appreciated, except when the load impedance $Z_L$ is equal to the characteristic impedance $Z_0$ of the transmission line 14 (i.e. the matched case), the maximum length Δz of the transmission line 14 is much lower in the un-compensated system than in the compensated system. Based on the results shown in FIG. 5, the maximum lengths Δz of the transmission line 14 for a sample set of load impedance magnitudes $|Z_L|$ is reproduced in Table 2. Note that the maximum Δz values in Table 2 were obtained by averaging the results for the three different load impedance phases −45°, 0° and +45°.

TABLE 2

| $|Z_L|$ (Ω) | Uncompensated System - Maximum Δz (m) | Compensated System - Maximum Δz (m) |
| --- | --- | --- |
| 5 | 0.027 | 1.360 |
| 50 | Infinite | N/A (matched) |
| 100 | 0.135 | 1.630 |
| 200 | 0.069 | 1.320 |

TABLE 2-continued

| $|Z_L|$ (Ω) | Uncompensated System - Maximum Δz (m) | Compensated System - Maximum Δz (m) |
| --- | --- | --- |
| 500 | 0.027 | 0.978 |
| 1000 | 0.014 | 0.777 |

As shown in Table 2, the presence of the MMTL 18 in the compensated system allows for a greater maximum length Δz of the transmission line 14 compared to when the MMTL 18 is not present in the un-compensated system. For example, when the load impedance $Z_L$ is 200Ω the maximum length Δz of the transmission line 14 in the un-compensated system (i.e. without the MMTL 18) is 0.069 m, but the maximum length Δz of the transmission line 14 in the compensated system (i.e. with the MMTL 18) is 1.32 m. This represents an increase by a factor of over 19.

Thus, in the power transfer system 10, the maximum length Δz of the transmission line 14 for which the input impedance $Z_{in}$ is sufficiently close to the load impedance $Z_L$ is greater than the maximum length Δz of the transmission line 14 when the MMTL 18 is not present. The increased maximum length Δz of the transmission line 14 of the power transfer system 10 that comprises the MMTL 18 allows for further separation of the power source 12 from the load 16 while at least partially reducing or eliminating the impedance transformation effect of the transmission line 14. This also allows for further separation of other power electronics from the load 14.

Figure 6:
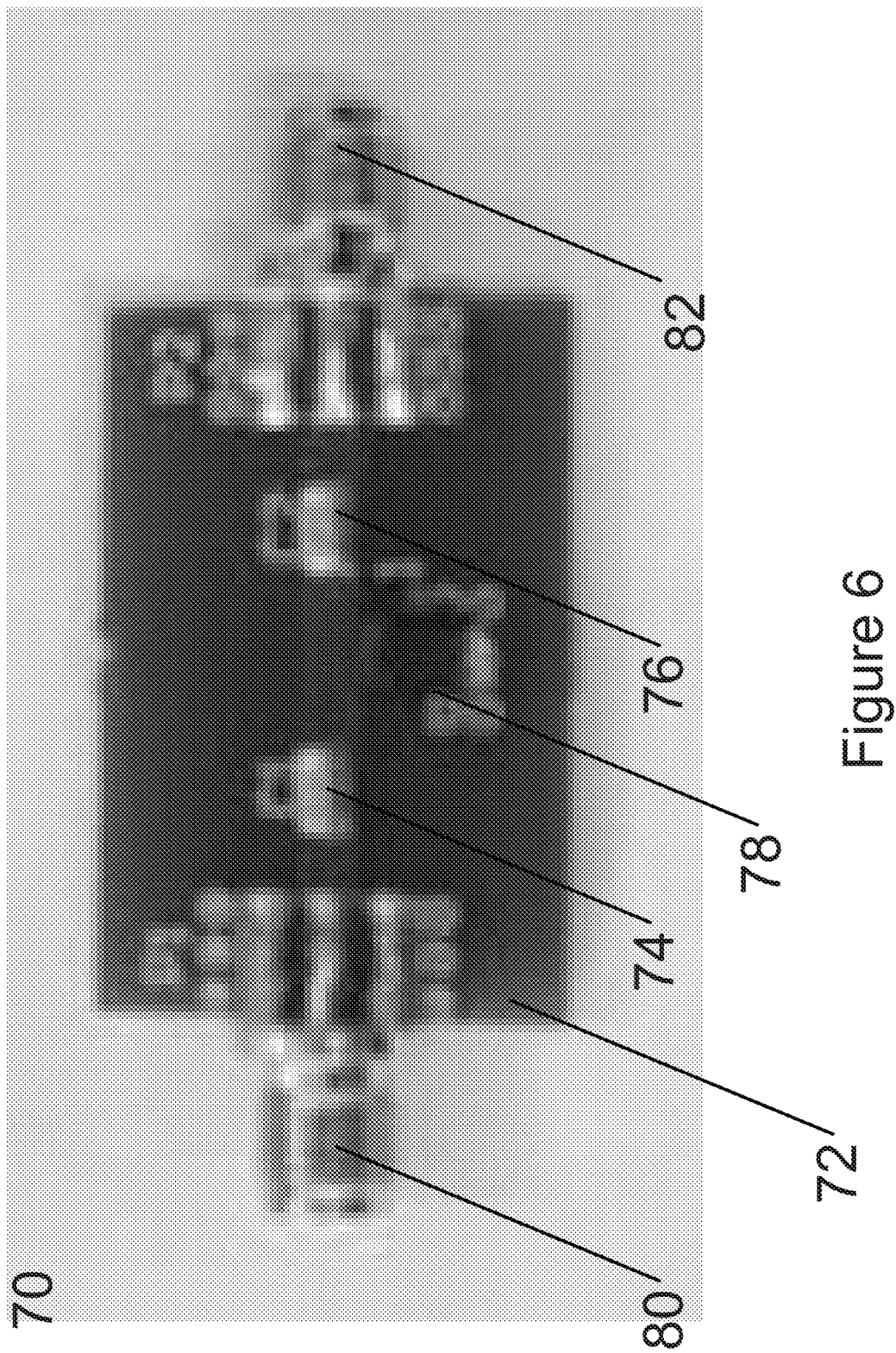
FIG. 6 is a photograph of a physically manufactured unit cell of FIG. 4.

Turning now to FIG. 6, a physically manufactured unit cell is shown and is generally identified at reference character 70. The unit cell 70 is designed and fabricated according to the circuit diagram of FIG. 4. The unit cell 70 comprises a printed circuit board (PCB) 72 upon which a first capacitor 74, a second capacitor 76 and an inductor 78 are mounted. The unit cell 70 further comprises two connectors 80 and 82. Each connector 80 and 82 is configured to connect to either the transmission line 14 or the power source 12.

The unit cell 70 parameters were calculated such that the unit cell 70 is configured to counteract the combined impedance transformation caused by a transmission line 14, the PCB 72, the first connector 80 and the second connector 82. In this embodiment, the transmission line 14 is a coaxial SMA cable. Calculations for the parameters of the unit cell 70 were performed for transmission line lengths of 0.1524 m (6"), 0.3048 m (12") and 0.6096 m (24"). In this embodiment, the operating frequency of the power transfer system is 13.56 MHz. The characteristic impedance $Z_0$ is 50Ω. The phase constant β is 0.426 rad/m. The required values of the first capacitor 74, second capacitor 76 and inductor 78 were determined according to Equations 20 and 21. For these calculations, Δz represents the length of the transmission line 14 in addition to the combined effective length of the PCB 72, first connector 80 and second connector 82 of the unit cell 70. As previously stated with reference to FIG. 4, the required capacitance of the first and second capacitors 74 and 76 is given by $2C_0$ while the required inductor 78 is given by $L_0$. The required values of $C_0$ and $L_0$ are shown in Table 3 below. While fabricating the unit cell 70, the particular capacitances and inductances calculated according to Equations 20 and 21 were approximated as closely as possible using available components. As one of ordinary skill in the art will appreciate, using components which do not closely match the calculated capacitances and inductances may result in a unit cell 70 which does not function as required.

TABLE 3

| Cable Length (m) | Calculated $L_0$ (μH) | Calculated $C_0$ (nF) |
|---|---|---|
| 0.1524 | 6.73 | 2.69 |
| 0.3048 | 3.89 | 1.55 |
| 0.6096 | 2.14 | 086 |

A set of constructed unit cells 70 having the parameters shown in Table 3 were tested for transmission lines 14 with length Δz of 0.1524 m (6"), 0.3048 m (12") and 0.6096 (24"). Each unit cell 70 was tested for a series of radio frequency (RF) load resistors with following nominal values: 50Ω, 150Ω, 300Ω, 510Ω, 750Ω and 1100Ω. A non-negligible impedance transformation was observed when measuring the resistors directly using a vector network analyzer (VNA) as shown in Table 4. These measured results were taken as the load impedances $Z_L$.

TABLE 4

| Nominal Load Resistance (Ω) | Measured $Z_L$ (Ω) |
|---|---|
| 50 | 49.9 + j0.1 |
| 150 | 149.4 − j6.2 |
| 300 | 296.4 − j27.8 |
| 510 | 495.3 − j80.5 |
| 750 | 708.5 − j168.6 |
| 1100 | 980.6 − j340.9 |

The transmission line 14 with the length Δz of 0.1524 m (6") was connected between the power source 12, which in this case was the VNA, and the particular load resistor in the set. The associated input impedance was then recorded on the VNA for a system that did not include the unit cell 70 (i.e. the uncompensated system).

In the compensated system, the unit cell 70 with the parameters shown in Table 3 designed to counteract the impedance transformation caused by the transmission line 14 with the physical length Δz of 0.1524 m (6") was connected between the power source 12, which in this case was the VNA, and the transmission line 14. The input impedance for this compensated system was then recorded.

Figure 7A:
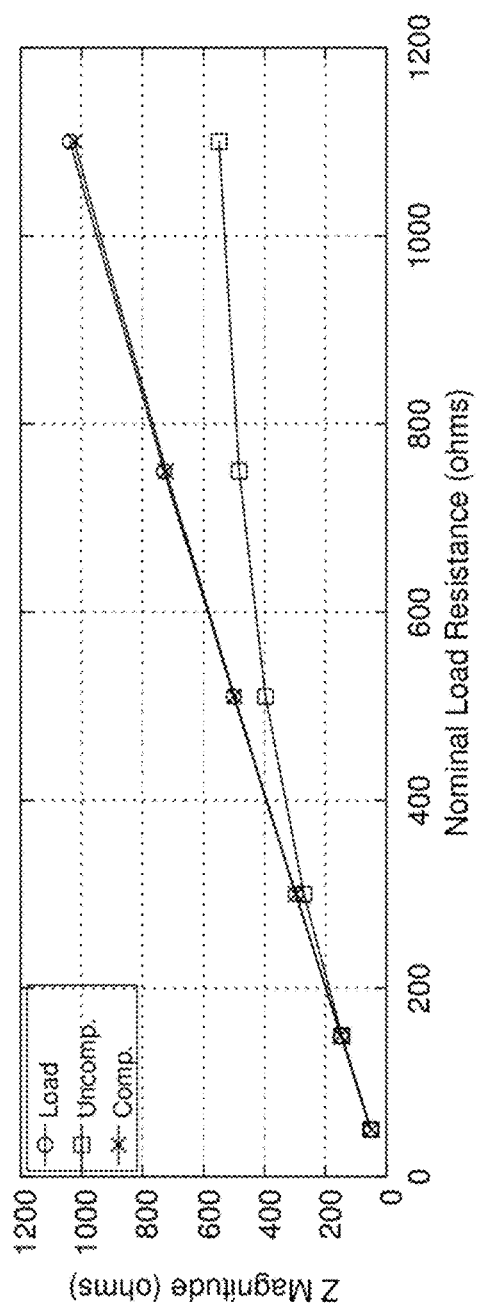
FIG. 7a is a graph of the magnitude of the input impedance versus the nominal load resistance of a system using the unit cell of FIG. 6 for a transmission line with a physical length of 0.1524 m.

FIG. 7a is a graph of the magnitude of the input impedance versus the nominal load resistance for the case of the transmission line 14 with the physical length Δz of 0.1524 m (6"), a characteristic impedance $Z_0$ of 50Ω and a phase constant β of 0.426 rad/m are shown. The input impedance magnitude for the uncompensated system is identified as 'Uncomp' in the legend. The load impedance magnitude is identified as 'Load' in the legend. As shown in FIG. 7a, the 'Uncomp' data does not match the 'Load' data. For example, when the nominal load resistance is 1100Ω, the magnitude of the input impedance for the uncompensated case is less than 600Ω. The magnitude of the input impedance for the compensated system when the unit cell 70 is present is identified as 'Comp' in the legend. In contrast with the 'Uncomp' data, the 'Comp' data, where the unit cell 70 is present, closely tracks the 'Load' data.

Figure 7B:
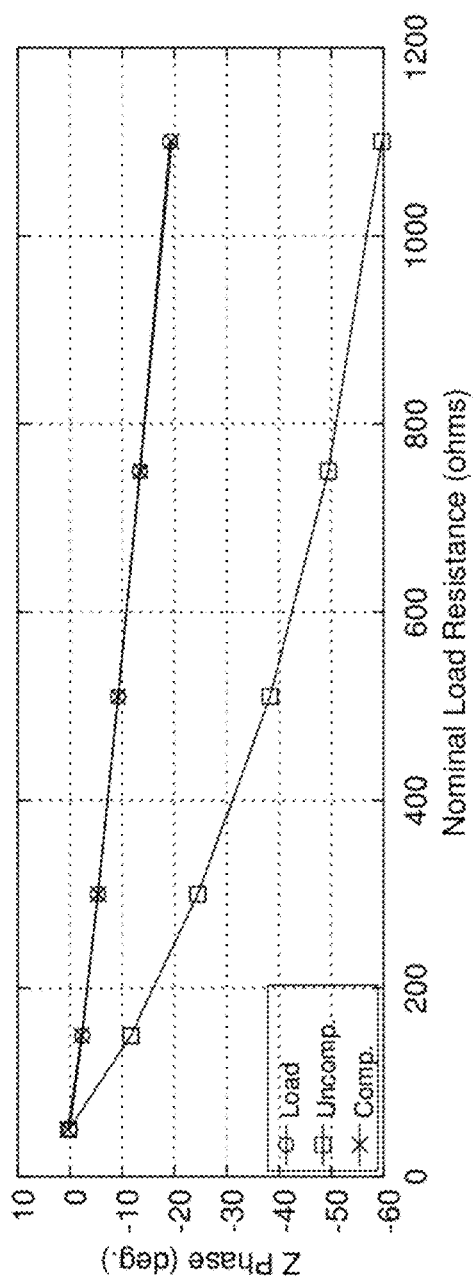
FIG. 7b is a graph of the phase of the input impedance versus the nominal load resistance of a system using the unit cell of FIG. 6 for a transmission line with a physical length of 0.1524 m.

FIG. 7b is a graph of the phase of the input impedance Z versus the nominal load resistance. The phase of the input impedance for the uncompensated system is identified as 'Uncomp' in the legend. The phase obtained when directly measuring the load is identified as 'Load' in the legend. As shown in FIG. 7b, comparing the 'Uncomp' data to the 'Load' data clearly shows a difference that rises as high as 40° The phase of the input impedance for the compensated system when the unit cell 70, is present is identified as 'Comp' in the legend. In contrast with the 'Uncomp' data, the 'Comp' data, where the unit cell 70 is present, is almost equal to the 'Load' data.

Thus, the unit cell 70 at least partially counteracts the impedance transformation caused by the 0.1524 m (6") transmission line 58.

In another unit cell 70 of the set, the constructed unit cell 70 was tested for the transmission line 14 with the length Δz of 0.3048 m (12"). The transmission line 14 was connected between the power source 12, which in this case was the VNA, and the particular load resistor. The associated input impedance $Z_{in}$ was then recorded for a system that did not include the unit cell 70 (i.e. the uncompensated system).

In the compensated system, the unit cell 70 with the parameters shown in Table 3 designed to counteract the impedance transformation caused by the transmission line 14 with the physical length Δz of 0.3048 m (12") was connected between the power source 12, which in this case was the VNA, and the transmission line 14. The input impedance $Z_{in}$ for this compensated system was then recorded.

FIG. 8a is a graph of the magnitude of the input impedance versus the nominal load resistance for the case of the transmission line 14 with the physical length Δz of 0.3048 m (12"), a characteristic impedance $Z_0$ of 50Ω and a phase constant β of 0.426 rad/m are shown. The input impedance magnitude for the uncompensated system is identified as 'Uncomp' in the legend. The load impedance magnitude is identified as 'Load' in the legend. As shown in FIG. 8a, the 'Uncomp' data does not match the 'Load' data. For example, when the nominal load resistance is 1100Ω, the magnitude of the input impedance for the uncompensated system is less than 400Ω. This results in a difference of 800Ω which is greater than the 500Ω difference recorded for a transmission line 58 with the physical length Δz of 0.1524 m (6"). The input impedance magnitude for the compensated system when the unit cell 70 is present is identified as 'Comp' in the legend. In contrast with the 'Uncomp' data, the 'Comp' data, where the unit cell 70 is present, closely tracks the 'Load' data.

FIG. 8b is a graph of the phase of the input impedance Z versus the nominal load resistance. The phase of the input impedance for the uncompensated system is identified as 'Uncomp' in the legend. The phase obtained when directly measuring the load is identified as 'Load' in the legend. As shown in FIG. 8b, comparing the 'Uncomp' data to the 'Load' data shows a difference that rises as high as about 50°. The phase of the input impedance for the compensated system, when the unit cell 70, is present is identified as 'Comp' in the legend. In contrast with the 'Uncomp' data, the 'Comp' data, where the unit cell 70 is present, is almost equal to the 'Load' data. The 'Comp' data is within 5° of the 'Load' data.

Thus, the unit cell 70 at least partially counteracts the impedance transformation caused by the 0.3048 m (12") transmission line 14.

In another unit cell 70 of the set, the constructed unit cell 70 was tested for the transmission line 14 with the length Δz of 0.6096 m (24"). The transmission line 14 was connected between the power source 12, which in this case was the VNA, and the load resistor. The associated input impedance $Z_{in}$ was then recorded on the VNA for a system 10 that did not include the unit cell 70 (i.e. the uncompensated system).

In the compensated system, the unit cell 70 with the parameters shown in Table 3 designed to counteract the impedance transformation caused by the transmission line 14 with the physical length Δz of 0.6096 m (24") was connected between the power source 12, which in this case was the VNA, and the transmission line 14. The input impedance $Z_{in}$ for this compensated system was then recorded.

FIG. 9a is a graph of the magnitude of the input impedance versus the nominal load resistance for the case of the transmission line 14 with the physical length Δz of 0.6096 m (24"), a characteristic impedance $Z_0$ of 50Ω and a phase constant β of 0.426 rad/m are shown. The input impedance magnitude for the uncompensated system is identified as 'Uncomp' in the legend. The load impedance magnitude is identified as 'Load' in the legend. As shown in FIG. 9a, the 'Uncomp' data does not match the 'Load' data. For example, when the nominal load resistance is 1100Ω, the magnitude of the input impedance for the uncompensated system is less than 200Ω. This results in a difference of more than 900Ω which is greater than: the 800Ω difference recorded for a transmission line 14 with the physical length Δz of 0.3048 (12"); and the 500Ω difference recorded for the transmission line 14 with the physical length z of 0.1524 m (6"). The input impedance magnitude for the compensated system when the unit cell 70 is present is identified as 'Comp' in the legend. In contrast with the 'Uncomp' data, the 'Comp' data, where the unit cell 70 is present, closely tracks the 'Load' data.

FIG. 9b is a graph of the phase of the input impedance Z versus the nominal load resistance. The phase of the input impedance for the uncompensated system is identified as 'Uncomp' in the legend. The phase obtained when directly measuring the load resistance is identified as 'Load' in the legend. As shown in FIG. 9b, comparing the 'Uncomp' data to the 'Load' data clearly shows a difference that rises as high as 60º. The phase of the input impedance for the compensated system, when the unit cell 70 is present, is identified as 'Comp' in the legend. In contrast with the 'Uncomp' data, the 'Comp' data, where the unit cell 70 is present, is almost equal to the 'Load' data. The 'Comp' data is within 5º of the 'Load' data.

Thus, the unit cell 70 at least partially counteracts the impedance transformation caused by the 0.6096 m (24") transmission line 14.

Figure 10:
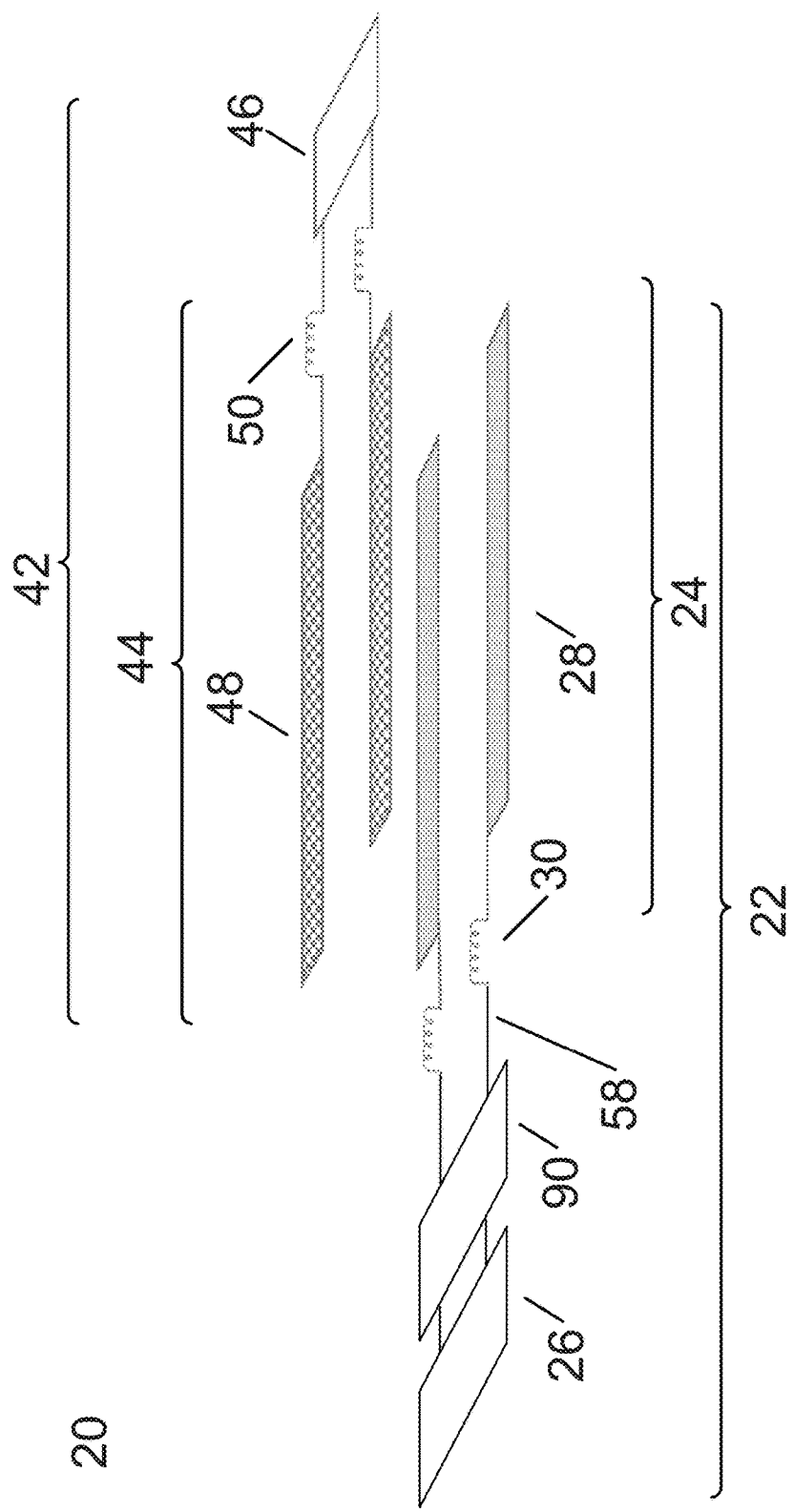
FIG. 10 is a schematic layout of a wireless power transfer system in accordance with an aspect of the subject disclosure.

Turning now to FIG. 10, a wireless power transfer system is shown and is generally identified by reference numeral 20. The wireless power transfer system 20 is similar to the power transfer system described in U.S. Pat. No. 9,653,948 issued on May 16, 2017 which is incorporated herein by reference in its entirety. The wireless power transfer system 20 comprises a transmitter 22 comprising a transmit resonator 24 electrically connected via a transmission line 58 to a power source 26. The wireless power transfer system 20 also comprises a receiver 42 comprising a receive resonator 44 electrically connected to a load 46. A MMTL is electrically connected between the power source 26 and the transmission line 58. The MMTL is configured to counteract the effect of the transmission line 58 as previously described. In this embodiment, the MMTL is a unit cell 90. The unit cell 90 is similar to the unit cell 70 previously described. The unit cell 90 is designed and fabricated according to the circuit diagram of FIG. 4. The unit cell 90 comprises a printed circuit board (PCB) upon which a first capacitor, a second capacitor and an inductor are mounted. The unit cell 90 further comprises two connectors. The unit cell 90 parameters were calculated such that the unit cell 90 is configured to counteract the combined impedance transformation caused by the transmission line 58, the PCB, and the first and second connectors. The first connector is configured to connect to the power source 26. The second connect is configured to connect to the transmission line 58.

The transmit resonator 24 comprises two electrodes 28, forming a capacitor. Each electrode 28 is electrically connected to an inductive coil 30 that is electrically connected via the transmission line 58 and the unit cell 90 to the power source 26. In this embodiment, the electrodes 28 of the transmit resonator 24 are laterally spaced. The electrodes 28 are elongate plates. The major surfaces of the elongate plates are in the same plane. Each elongate plate is a generally rectangular, planar plate. Each elongate plate is formed of electrically conductive material. While two electrodes 28 are depicted, one of ordinary skill in the art will appreciate that more electrodes may be used.

The receive resonator 44 comprises two electrodes 48, forming a capacitor, electrically connected to an inductive coil 50. In this embodiment, the electrodes 48 of the receive resonator 44 are laterally spaced. The electrodes 48 are elongate plates. The major surfaces of the elongate plates are in the same plane. Each elongate plate is a generally rectangular, planar plate. Each elongate plate is formed of electrically conductive material. While two electrodes 48 are depicted, one of ordinary skill in the art will appreciate that more electrodes may be used.

In this embodiment, the inductive coils 30 and 50 of the transmit and receive resonator 24 and 44, respectively, are ferrite core inductors. One of skill in the art will appreciate that other cores are possible. The receive resonator 44 is tuned to the resonant frequency of the transmit resonator 24.

While the electrodes 28 and 48 have been described as laterally spaced, elongate plates, one of skill in the art will appreciate that other configurations are possible including, but not limited to, concentric, coplanar, circular, elliptical, disc, etc., electrodes. Other suitable electrode configurations are described in U.S. patent application Ser. No. 14/846,152 filed on Sep. 4, 2015, the relevant portions of which are incorporated herein by reference.

While two inductive coils 30 have been shown as being connected via the transmission line 58 and the unit cell 90 in series to the power source 26, one of skill in the art will appreciate that a single inductive coil 30 may be used for both electrodes 28 of the transmit resonator 24. In this case, the single inductive coil 30 is electrically connected via the transmission line 58 and the unit cell 90 to the power source 26 and the electrodes 28 in parallel.

Similarly, while two inductive coils 30 have been shown as being connected in series to the load 46, one of skill in the art will appreciate that a single inductive coil 30 may be used for both electrodes 48 of the receive resonator 44. In this embodiment, the single inductive coil 30 is electrically connected to the load 46 and the electrodes 48 in parallel.

During operation, power is transferred from the power source 26 to the electrodes 28 via the unit cell 90, the transmission line 58 and the inductive coils 30 of the transmit resonator 24. In particular, the sinusoidal power signal from the power source 26 that is transmitted to the electrodes 28 via the inductive coil 30 excites the transmit resonator 24 causing the transmit resonator 24 to generate an electric field. A differential voltage is applied on the electrodes 28 of the transmit resonator 24, which creates an electric field in the surrounding environment. When the receive resonator 44 is placed within the generated electric field and tuned to the resonant frequency of the transmit resonator 24, the receive resonator 44 extracts power from the transmitter 22 via resonant electric field coupling. The extracted power is then transferred from the receive resonator 44 to the load 46.

During operation the transmit resonator 24 may generate a magnetic field. However, little, if any power is transferred from the transmit resonator 24 to the receive resonator 44 via magnetic field coupling as the receive resonator 44 is not configured to receive power via magnetic field coupling.

The transmission line 58 separates the power source 26 from the transmit resonator 24. The transmission line 58 may further separate the transmit resonator 24 from other transmit electronics which are not shown. The transmission line 58 results in at least a partial impedance transformation which adds reactance and changes the resistance of the impedance presented to the power source 26 as previously described.

The input impedance of the load which effectively consists of the transmit resonator 24 is designed to equal a nominal value to which the power source 26 can most efficiently and effectively transfer power. In conventional wireless power transfer systems, this is achieved using an impedance transformation network at the power source 26. However, if the impedance of the transmit resonator 24 varies over time due to, for example, changes in the distance between the transmitter 22 and the receiver 42, the impedance transformation network must be dynamic.

The presence of the transmission line 58 affects the impedance seen by a dynamic (or static) impedance transformation network (as shown in Table 1 and Equations 4 and 5). This effectively detunes the transmit resonator 24 from the resonant frequency. Thus, the impedance transformation network is required to correct for the affected impedance. This places an additional burden on the impedance transformation network. The unit cell 90 addresses this by countering the impedance transformation caused by the transmission line 58, thus ensuring that the transmit resonator 24 stays tuned.

As previously stated, the input impedance of the transmit resonator 24 acts as the load impedance and varies with the degree of coupling to the receive resonator 44. In this case, the degree of coupling and therefore the impedance is varied by changing the distance separating the resonators 24 and 44, respectively. To obtain the baseline measurements, the power source 26 (VNA) was connected directly to the transmit resonator 24 and the receive resonator 44 was terminated in a 50Ω load.

A transmission line 58 with a physical length $\Delta z$ of 0.3048 m (12") characteristic impedance $Z_0$ of 50Ω and phase constant $\beta$ of 0.426 rad/m was connected between the power source 26 (VNA) and the transmit resonator 24. The unit cell 90 was connected between the transmission line 58 and the transmit resonator 24. In an uncompensated system, the unit cell 90 was omitted. The separation between the transmit and receive resonators 24 and 44, respectively, was varied from 5 to 30 cm in 5 cm steps and the input impedance $Z_{in}$ was recorded for the compensated and uncompensated systems.

FIG. 11a is a graph of the magnitude of the input impedance of the transmit resonator 24 versus the separation between the transmit and receive resonators 24 and 44, respectively. The input impedance magnitude for the uncompensated system is identified as 'Uncomp' in the legend. The resonator impedance magnitude is identified as 'Resonator' in the legend. As shown in FIG. 11a, the 'Uncomp' data does not match the 'Resonator' data. For example, at a resonator separation of 10 cm, the magnitude of the input impedance of the transmit resonator should be approximately 1500Ω. However, the uncompensated results indicate an input impedance magnitude of roughly 450Ω. The input impedance magnitude for the compensated system when the unit cell 90 is present is identified as 'Comp' in the legend. In contrast with the 'Uncomp' data, the 'Comp' data, where the unit cell 90 is present, closely tracks the 'Resonator' data.

FIG. 11b is a graph of the phase of the input impedance versus the separation between the transmit and receive resonators 24 and 44, respectively. The phase of the input impedance for the uncompensated system is identified as 'Uncomp' in the legend. The phase obtained when directly measuring the resonator impedance is identified as 'Resonator' in the legend. As shown in FIG. 11b, comparing the 'Uncomp' data to the 'Resonator' data clearly shows a difference that rises as high as approximately 150°. The phase of the input impedance for the compensated system, when the unit cell 90 is present, is identified as 'Comp' in the legend. In contrast with the 'Uncomp' data, the 'Comp' data, where the unit cell 90 is present, is almost equal to the 'Load' data.

Thus, the unit cell 90 at least partially counteracts the impedance transformation effect of the 0.3048 m (12") transmission line 58 on the input impedance of the transmit resonator 24 in the wireless power transfer system 20 when the separation distances between the transmit and receive resonators vary.

Although embodiments have been described above with reference to the figures, those of skill in the art will appreciate that variations and modifications may be made without departing from the scope thereof as defined by the appended claims.

What is claimed is:

1. A transmitter comprising:
   a transmit resonator electrically connected to a power source of the transmitter via an electrically small transmission line, the transmit resonator comprising:
   at least two electrodes; and
   at least one inductive coil electrically connected to the electrodes, wherein the transmit resonator is configured to generate an electric field when excited by the power source, wherein the electrically small transmission line is shorter in length than a wavelength of excitation of a power signal generated by the power source; and
   a metamaterial transmission line (MMTL) electrically connected between the power source and the electrically small transmission line, the MMTL configured to counteract an effect of the electrically small transmission line, wherein the MMTL has a negative phase velocity (NPV).

2. The transmitter of claim 1, wherein the electrically small transmission line has a phase constant $\beta$ and a physical length $\Delta z$, and wherein $\tan(\beta \Delta z) \approx \beta \Delta z.$ 3. The transmitter of claim 1, wherein the electrically small transmission line has a phase constant $\beta$ and a physical length $\Delta z$, and wherein $\beta \Delta z < 0.2$ radians.

4. The transmitter of claim 1, wherein the electrically small transmission line has a physical length $\Delta z$, wherein the power signal has a wavelength $\lambda$, and wherein $\Delta z < \lambda/30$.

5. The transmitter of claim 1, wherein the MMTL is configured to counteract the impedance transformation effect of the electrically small transmission line on an input impedance of the transmit resonator.

6. The transmitter of claim 1, wherein the MMTL comprises a unit cell.

7. The transmitter of claim 6, wherein the unit cell comprises a symmetrical T-network.

8. The transmitter of claim 7, wherein the symmetrical T-network comprises two series capacitors and a shunt inductor.

9. The transmitter of claim 8, wherein the capacitance of the capacitors is given by $2C_0$ and the inductance of the inductor is given by $L_0$, wherein:

$$C_0 \cong \frac{1}{\omega^2 Z_0 \beta \Delta z}$$

$$L_0 \cong \frac{Z_0}{\omega^2 \beta \Delta z}$$

and wherein $Z_0$ is the characteristic impedance of the transmission line, $\beta$ is the phase constant of the electrically small transmission line, $\Delta z$ is the length of the electrically small transmission line and w is the angular frequency of a power signal output by the power source.

10. The transmitter of claim 6, wherein the unit cell comprises a symmetrical π-network.

11. The transmitter of claim 1, wherein the MMTL comprises n unit cells, where n is a positive integer.

12. The transmitter of claim 1, further comprising the power source.

13. A system comprising:
a transmitter comprising:
  a transmit resonator electrically connected to a power source of the transmitter via an electrically small transmission line, the transmit resonator comprising:
    at least two electrodes; and
    at least one inductive coil electrically connected to the electrodes, wherein the transmit resonator is configured to generate an electric field when excited by the power source, wherein the electrically small transmission line is shorter in length than a wavelength of excitation of a power signal generated by the power source; and
  a metamaterial transmission line (MMTL) electrically connected between the power source and the electrically small transmission line, the MMTL configured to counteract an effect of the electrically small transmission line, wherein the MMTL has a negative phase velocity (NPV); and
a receiver configured to extract power from the generated electric field via resonant electric field coupling.

14. The system of claim 13, wherein the receiver further comprises:
a load; and
a receive resonator electrically connected to the load.

15. The system of claim 14, wherein the receive resonator comprises:
at least two electrodes; and
at least one inductive coil electrically connected to the electrodes of the receiver, wherein the receive resonator is configured to receive power transmit resonator via resonant electric field coupling.

16. The system of claim 1, wherein the transmitter further comprises the power source.

* * * * *